United States Patent [19]
Thomas

[11] 4,164,801
[45] Aug. 21, 1979

[54] BEAR CLAW ICE SCRAPER

[75] Inventor: Robert R. Thomas, Hartford, Kans.

[73] Assignee: Hopkins Manufacturing Corporation, Emporia, Kans.

[21] Appl. No.: 847,742

[22] Filed: Nov. 2, 1977

[51] Int. Cl.$^2$ .................. A47L 17/06; B60S 1/04; E01H 5/02
[52] U.S. Cl. .................... 15/236 R; 30/172
[58] Field of Search ............... 15/210.5, 236 R, 104 S, 15/235.6; 30/169, 172, 164.5, 164.8; 37/53

[56] References Cited
U.S. PATENT DOCUMENTS

| | | | |
|---|---|---|---|
| 1,018,844 | 9/1912 | Meyer | 30/169 |
| 1,377,484 | 5/1921 | Huneryager | 30/172 |
| 1,641,522 | 9/1927 | Beckord | 30/172 |
| 1,919,351 | 7/1933 | Willadsen | 30/172 X |
| 2,277,528 | 3/1942 | Osborn | 15/236 R |
| 3,566,430 | 3/1971 | Young | 30/172 X |
| 4,040,140 | 8/1977 | Hopkins | 15/236 R |

FOREIGN PATENT DOCUMENTS

| | | | |
|---|---|---|---|
| 89534 | 2/1922 | Austria | 15/210.5 |
| 727126 | 3/1932 | France | 30/169 |
| 171454 | 8/1934 | Switzerland | 15/236 R |
| 561595 | 5/1944 | United Kingdom | 15/236 R |

Primary Examiner—Daniel Blum
Attorney, Agent, or Firm—Kenway & Jenney

[57] ABSTRACT

An ice scraper comprising a one-piece body defining a handle section, a downwardly curved intermediate section, and a blade region comprising a plurality of downwardly curved, independently flexible, resilient scraping fingers. In use, the scraping fingers bow or flex when scraping force is applied to ice to be removed, induce the formation of fractures in the ice, and thereafter resiliently return to their unflexed position, imparting force to fractured ice tending to throw it away from the surface to be scraped.

The separable, independently flexible fingers enable the ice scraper to effectively conform to curved surfaces and avoid the possible incomplete cleaning action of said blade structures.

4 Claims, 4 Drawing Figures

BEAR CLAW ICE SCRAPER

BACKGROUND OF THE INVENTION

This invention relates to an improved one-piece, hand-held scraper for removing ice from windshields or the like.

Recently, hand-held ice scrapers made of a flat integral piece of polymeric material such as polymethacrylate have become widely available. These scrapers comprise an elongate body including top and bottom surfaces, spaced about 7 mm apart and defining a wide scraper blade at one end thereof. The blade comprises an oblique surface extending from the top surface toward the bottom surface and terminating in a scraping edge. From the blade section, the body tapers inwardly defining opposed converging edges. A pliable, polymeric sheath envelops the end remote from the scraper blade and covers about two-thirds of the linear extent of the ice scraper to serve as a hand grip.

U.S. application Ser. No. 687,073 entitled "Ice Scraper" to E. L. Hopkins et al., filed May 17, 1976, now U.S. Pat. No. 4,040,140, is directed to a significantly improved ice scraper of the general type set forth above. That patent discloses a scraper comprising a one-piece body defining a blade at one end thereof, a tapered handle section remote from the blade, and an intermediate section disposed between the handle section and blade. The intermediate section is curved downwardly such that the blade is disposed below the handle section. This construction enables the user to exert optimal scraping force in a direction generally parallel to the surface to be scraped and minimizes ice accumulation on the hand of the user. Also, the Hopkins et al. improved blade construction uniquely resists edge chipping.

SUMMARY OF THE INVENTION

In its basic aspects, the present invention resides in an improved hand-held scraper for removing ice from a surface, which scraper comprises a handle section;

an intermediate section extending from said handle section, and a blade region comprising a plurality of resilient, independently flexible, scraping fingers, each extending from said intermediate section and terminating in a scraping edge.

Each flexible scraping finger comprises chisel means, terminating in a scraping edge, and operable to engage an ice covered surface with an ice deflecting surface thereof being inclined at an obtuse angle in relation to a portion of said surface to be scraped, flexible beam means connected with the intermediate section, and joint means operable to be located spaced from the surface to be scraped and interconnecting said flexible beam means and said chisel means.

The aforesaid joint means is operable to permit flexing of the associated flexible beam means in response to scraping force exerted by the associated chisel means. In addition, the chisel means has an overall wedge shaped configuration inclined at an obtuse angle in relation to a portion of the surface to be scraped and has a median thickness less than the median thickness of the flexible beam means.

The aforesaid scraping fingers are operable, when a user gripping the handle section applies force generally longitudinally of an ice covered surface to be scraped, to independently flex so that the scraping edges are operable to become independently wedged in ice to be scraped and ice fracturing energy is stored in the flexible, curved beam means, to exert force against the ice resulting from energy imparted to the handle by the user and the aforesaid stored energy, this force being sufficient to cause fracturing of said ice, and to resiliently return to their original shape and therefore facilitate displacement of fractured ice away from the surface to be scraped.

Preferably, the scraper of the invention features lateral edges which converge inwardly back from the blade. This construction facilitates flexure of the fingers at the point where they join the intermediate section of the scraper body.

In addition, the center scraping finger is preferably relatively wide so as to provide a stabilizing action, promoting uniform scraping.

Accordingly, objects of the invention include the provision of an ice scraper embodying structure which functions to fracture and remove ice adhered to a smooth surface in an improved and novel manner. Other objects of the invention are to provide an ice scraper which may be inexpensively fabricated from widely available polymeric materials, and to provide a scraper having a blade configuration which effectively distributes and concentrates applied scraping force to a plurality of discrete locations thereby providing for effective ice removal.

A further independently significant aspect of the invention resides in a contiguous array of flexible beam supported, forward facing, generally laterally cntiguous chisel means operable to define a curved surface scraping means.

These and other objects and features of the invention will be apparent to those skilled in the art from the following description of a preferred embodiment and from the drawing, wherein like reference characters in the respective figures indicate corresponding parts.

BRIEF DESCRIPTION OF THE DRAWINGS

By way of example, but not limitation, preferred embodiments of the invention are depicted in the drawing, wherein.

DESCRIPTION OF THE PREFERRED EMBODIMENTS

Figure 1:
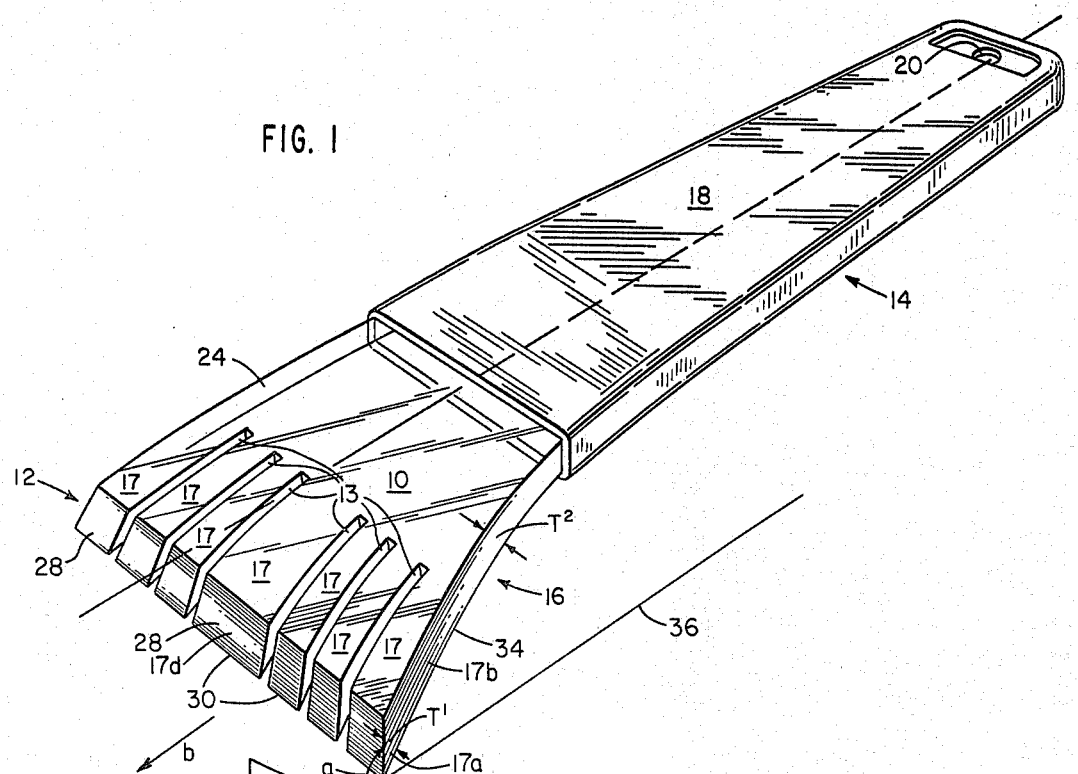
FIG. 1 is a perspective view of an ice scraper embodying the invention.
Figure 2:
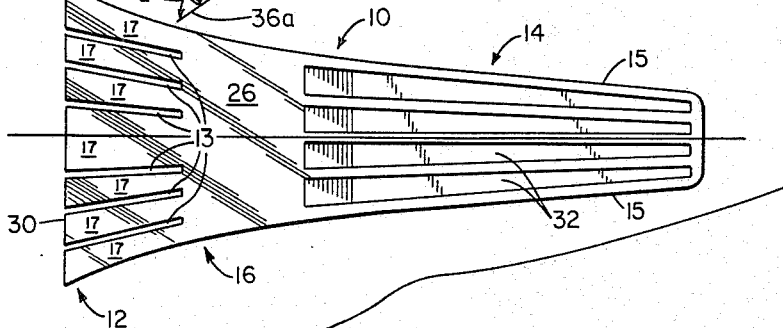
FIG. 2 is a bottom-plan view of the scraper of FIG. 1.

FIGS. 1 and 2 show a first embodiment of the invention which comprises a one-piece polymethacrylate or polycarbonate molded body 10, having a pair of substantially congruent top and bottom surfaces 24, 26, and defining a blade region 12, a handle section 14, and an intermediate section 16 extending therebetween. A hand grip 18 of polyvinyl chloride or the like envelops the handle section 14. Handle 14 and hand grip 18 may define hole means 20 useful for storing the scraper on a hanger.

The blade region 12 is intersected by a plurality of grooves or cuts 13 which extend back through the body of the scraper and intersect with the top and bottom surfaces 24 and 26 to define a plurality of downwardly curved, independently flexible, resilient scraping fingers 17. Each finger terminates in an oblique deflecting surface 28 which extends from the top surface 24 and intersects with bottom surface 26 to define a scraping edge 30.

As shown most clearly in FIG. 2, the lateral edges of the scraping fingers converge slightly inwardly resulting in fingers which are narrowest at their point of attachment to intermediate section 16. This construction facilitates flexure.

Each flexible scraping finger 17 comprises flexible chisel means 17a, terminating in a scraping edge 30 and operable to engage an ice covered surface 36 with an ice deflecting surface thereof 28 being inclined at an obtuse angle "a" in relation to a portion 36a of the surface to be scraped, flexible, curved beam means 17b connected with the intermediate section 16, and concave joint means 17c located spaced from surface 36 and interconnecting the flexible curved beam means 17b and said chisel means 17a with the flexible chisel means 17a being inclined in a forward facing, scraping direction "b".

As will be understood, the flexibility of chisel means 17a and beam means 17b is a consequence of the resilient nature of the plastic body 10. As will be apparent, the flexibility of chisel means 17a will be rather limited.

Each joint means 17c is operable to permit generally independent flexing of the flexible chisel means 17a and the flexible, curved beam means 17b on opposite ends of the joint means 17c.

Further, each flexible chisel means 17a has an overall wedge shaped configuration, inclined at the obtuse angle "a" in relation to a portion of the surface 36 to be scraped and has a median thickness $T^1$ less than the median thickness $T^2$ of the associated flexible, curved beam means 17b.

As also shown in FIG. 2, the preferred embodiment of the scraper is widest at the scraping blade 12 and arcuately tapers inwardly and backwardly toward the handle section 14 at intermediate section 16. The lateral edges 15 of the handled section 14 are inclined at an angle of convergence less than the angle of convergence of the intermediate section 16. This construction enables the provision of a wide blade together with a hand-fitting handle without sacrificing the strength of the intermediate section.

As is shown in FIG. 1, the scraping fingers include a wide stabilizing finger 17d, located generally centrally of the blade region 12. Central finger 17d is wider than the remainder of the scraping fingers and is thus operable to tend to stabilize said blade region 12 is a generally uniform scraping position, with the flexible scraping fingers 17 being uniformly inclined relative to the surface 36.

Handle section 14 may also include a series of longitudinal grooves 32, which conserves material and provides an anti-suction effect so that handgrip 18 may be readily removed. The intermediate section 16 is preferably curved to define a concave portion 34 of the bottom surface 26. This enables the user to grip handgrip 18 and to apply scraping force longitudinally of the surface to be scraped 36, e.g., a windshield, yet the fingers of the hand of the user do not contact the windshield surface and the blade 12 is in an ideal or optimum orientation relative to surface 36 for scraping ice.

Figure 3:
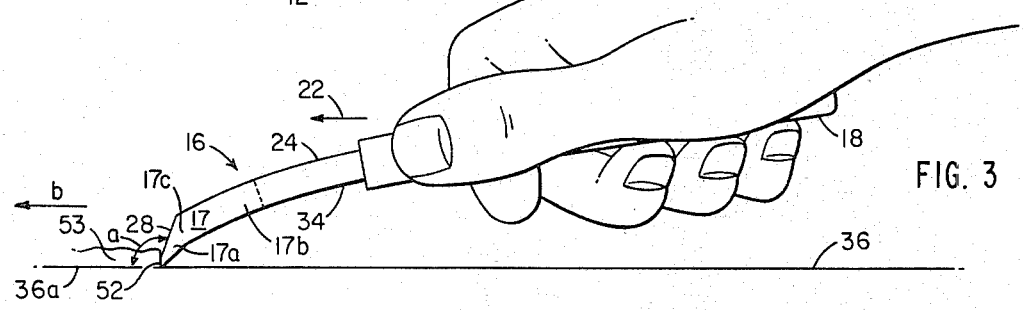
FIG. 3 is a side-plan view of another embodiment of the scraper of the invention in use.
Figure 4:
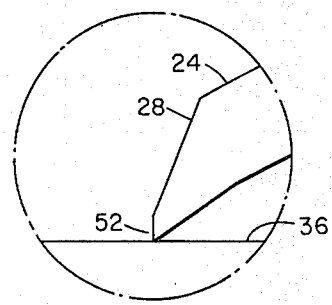
FIG. 4 is a fragmentary, detailed view of the scraping blade region of the scraper of FIG. 3.

FIG. 3, in addition to illustrating the orientation of a scraper of the invention with respect to the surface to be scraped 36, also illustrates another embodiment of the invention wherein each finger has a rectangular end surface 52 which intersects oblique surface 28 and bottom surface 26. As shown most clearly in FIG. 4, the rectangular surface 52 is oriented on the fingers 17 such that when the scraper is in use, surface 52 is nearly perpendicular or normal to the surface to be scraped 36. Typically, this means that the interior angle of intersection between top surface 24 and oblique deflecting surface 28 is between about 120° and 160° and the interior angle of intersection of rectangular surface 52 with oblique surface 28 is between about 140°-170°. The vertical dimension of the rectangular surface 52 is between about 0.2 mm and 1.2 mm, preferably about 0.7 mm.

The operation of both embodiments is very similar. Thus, with respect to the embodiment illustrated in FIGS. 1 and 2, when scraping force is applied in the direction of arrow 22, the edge 30 becomes nested between the ice and windshield, i.e. becomes wedged in the ice. As resistance is encountered the fingers independently flex or bow until the ice fractures, at which time resilient return of the fingers to their original position imparts an upward force to fractured pieces of ice.

With respect to the embodiment of FIG. 3, when scraping force is applied in the direction of arrow 22, each rectangular surface 52 is pressed against the edge of ice to be removed 53 and may become wedged therein. As resistance is encountered in a manner similar to that set forth above, each finger 17, is flexed or bowed along the downwardly curved finger configuration and the rectangular surfaces 52 are displaced slightly downwardly in relation to the handle section 14 and the hand of the user. Because of the independent forces exerted by the respective scraping fingers 17, multiple fractures develop in the ice 53.

Especially with the embodiment of FIG. 3, formation of the fractures may be facilitated by a momentary slight lateral spreading of the fingers. With both embodiments, immediately after the formation of a fracture, the potential energy stored in a flexed or bowed scraping finger 17 is released as the finger resiliently returns to its original shape, resulting in a net upward movement of the finger 17 and in a lifting or displacing motion being imparted to the separated piece of ice. As movement continues in the direction of arrow 22, the ice pieces are directly forwardly by oblique, deflecting surface 28.

I claim:

1. A hand-held scraper for removing ice from a smooth surface, said scraper comprising a one piece body defining;

a handle section;

an intermediate section extending from said handle section; and a blade region comprising a plurality of concave, resilient, independently flexible, scraping fingers, each extending from said intermediate section and terminating in a scraping edge, each said flexible scraping finger comprising flexible chisel means, terminating in a said scraping edge, and operable to engage an ice covered surface with an ice deflecting surface thereof being inclined at an obtuse angle in relation to a portion of said surface to be scraped, flexible curved beam means connected with said intermediate section, and concave joint means located spaced from said surface and interconnecting said flexible curved beam means and said chisel means, with said flexible chisel means being inclined in a forward facing, scraping direction, said joint means being operable to permit generally independent flexing of said flexible chisel means and said flexible, curved beam means on opposite ends of said joint means; and said flexible chisel means having an overall wedge shaped configuration inclined at an obtuse angle in relation to a portion of said surface to. be scraped and having a median thickness less than the median thickness of said flexible, curved beam means;

said scraping fingers being operable, when a user gripping the handle section applies forces generally longitudinally of an ice covered surface to be scraped, to independently flex so that said scraping, edges are operable to become independently wedged in ice to be scraped and ice fracturing energy is stored in said flexible, curved beam means, to exert force against the ice resulting from energy imparted to said handle by said user and said stored energy, said force being sufficient to cause fracturing of said ice, and to resiliently return to their original shape and therefore facilitate displacing of fractured ice away from the surface to be scraped; and at least some of said scraping fingers each having and end, merging with said intermediate section, and having a width, measured transversely of said direction of applied force and across said ice covered surface, which is less than the width of the scraping edge thereof, each such scraping finger being defined by lateral edges which converge longitudinally of said direction of applied force and away from the scraping edge thereof;

said fingers alternating transversely of said blade region with groove means, with said blade region including a plurality of said groove means, and said plurality of said groove means being generally mutually converging in a direction extending generally longitudinally of said scraper and away from said scraping edge; and said scraping fingers including central stabilizing finger means located generally centrally of said blade region and operable to tend to stabilize said blade region in a generally uniform scraping position with said flexible scraping fingers being generally uniformly inclined relative to said surface to be scraped.

2. A hand-held scraper for removing ice from a surface, said scraper comprising:

a handle section;

an intermediate section extending from said handle section; and a blade region comprising a plurality of resilient, independently flexible, scraping fingers, each extending from said intermediate section and terminating in a scraping edge, each said flexible scraping finger comprising chisel means, terminating in a said scraping edge, and operable to engage an ice covered surface with an ice deflecting surface thereof being inclined at an obtuse angle in relation to a portion of said surface to be scraped, flexible beam means connected with said intermediate section, and joint means operable to be located spaced from said surface and interconnecting said flexible beam means and said chisel means, said joint means being operable to permit flexing of said flexible beam means in response to scraping force exerted by said chisel means, and said chisel means having an overall wedge shaped configuration inclined at an obtuse angle in relation to a portion of said surface to be scraped and having a median thickness less than the median thickness of said flexible beam means;

said scraping fingers being operable, when a user gripping the handle section applied force generally longitudinally of an ice covered surface to be scraped, to independently flex so that said scraping edges are operable to become independently wedged in ice to be scraped and ice fracturing energy is stored in said flexible, beam means, to exert force against said ice resulting from energy imparted to said handle by said user and said stored energy, said force being sufficient to cause fracturing of said ice, and to resiliently return to their original shape and therefore facilitate displacing of fractured ice away from the surface to be scraped; and at least some of said scraping fingers each having an end, merging with said intermediate section, and having a width, measured transversely of said direction of applied force and across said ice covered surface, which is less than the width of the scraping edge thereof, each such scraping finger being defined by lateral edges which converge longitudinally of said direction of applied force and away from the scraping edge thereof;

said fingers alternating transversely of said blade region with groove means, with said blade region including a plurality of said groove means, and said plurality of said groove means being generally mutually converging in a direction extending generally longitudinally of said scraper and away from said scraping edge; and said scraping fingers including central stabilizing finger means located generally centrally of said blade region and operable to tend to stabilize said blade region in a generally uniform scraping position with said flexible scraping fingers being generally uniformly inclined relative to said surface to be scraped.

3. A hand-held scraper for removing ice from a surface, said scraper comprising:

a handle section;

an intermediate section extending from said handle section; and a blade region comprising a plurality of resilient, independently flexible, scraping fingers, each extending from said intermediate section and terminating in a scraping edge, each said flexible scraping finger comprising
- chisel means, terminating in a said scraping edge, and operable to engage an ice covered surface with an ice deflecting surface thereof being inclined at an obtuse angle in relation to a portion of said surface to be scraped,
- flexible beam means connected with said intermediate section, and
- joint means operable to be located spaced from said surface and interconnecting said flexible beam means and said chisel means,
- said joint means being operable to permit flexing of said flexible beam means in response to scraping force exerted by said chisel means, and
- said chisel means having an overall wedge shaped configuration inclined at an obtuse angle in relation to a portion of said surface to be scraped and having a median thickness less than the median thickness of said flexible beam means;

said scraping fingers being operable, when a user gripping the handle section applied force generally longitudinally of an ice covered surface to be scraped,
- to independently flex so that said scraping edges are operable to become independently wedged in ice to be scraped and ice fracturing energy is stored in said flexible, beam means,
- to exert force against said ice resulting from energy imparted to said handle by said user and said stored energy, said force being sufficient to cause fracturing of said ice, and
- to resiliently return to their original shape and therefore facilitate displacing of fractured ice away from the surface to be scraped; and at least some of said scraping fingers each having an end, merging with said intermediate section, and having a width, measured transversely of said direction of applied force and across said ice covered surface, which is less than the width of the scraping edge thereof, each such scraping finger being defined by
- lateral edges which converge longitudinally of said direction of applied force and away from the scraping edge thereof;
- a stabilizing finger, located generally centrally of said blade region, and being wider than the remainder of said scraping fingers;
- said stabilizing finger being operable to tend to stabilize said blade region in a generally uniform scraping position with said flexible scraping fingers being uniformly inclined relative to said surface to be scraped.

4. An ice scraper comprising
handle means; and
a plurality of ice scraping chisel means arranged in a generally laterally contiguous array to define an articulated scraping edge means operable to scrape a curved swath, the curvature of which is transverse to the direction of scraping movement,
- said chisel means being operable to face toward ice to be scraped and being supported on independent flexible beam means, said chisel means array including
- a central stabilizing chisel means,
- a plurality of additional chisel means disposed on each of opposite sides of said stabilizing chisel means,
- said stabilizing chisel means having a width transverse to said direction of scraping movement exceeding the width of said chisel means of said plurality of additional chisel means;
- at least some of said chisel means having lateral edges converging generally along said cutting direction, away from scraping edge extremeties thereof; and each of said chisel means including
- a generally wedge-shaped extremity defining a said scraping edge extremity,
- said generally wedge-shaped extremity being inclined relative to said handle means, generally downwardly and forwardly therefrom toward said ice to be scraped when said ice scraper is engaged therewith.

* * * * *